(12) United States Patent
Mesko et al.

(10) Patent No.: US 10,881,162 B2
(45) Date of Patent: Jan. 5, 2021

(54) DEVICE FOR MINIMIZING IMPACT OF COLLISIONS FOR A HELMET

(71) Applicant: Exero Labs LLC, Chargrin Falls, OH (US)

(72) Inventors: Zoltan Mesko, Twinsburg, OH (US); Benjamin R. Rizzo, East Lansing, MI (US)

(73) Assignee: Exero Labs LLC, Chargrin Falls, OH (US)

( * ) Notice: Subject to any disclaimer, the term of this patent is extended or adjusted under 35 U.S.C. 154(b) by 248 days.

(21) Appl. No.: 15/571,438

(22) PCT Filed: May 5, 2016

(86) PCT No.: PCT/US2016/030943
§ 371 (c)(1),
(2) Date: Nov. 2, 2017

(87) PCT Pub. No.: WO2016/179369
PCT Pub. Date: Nov. 10, 2016

(65) Prior Publication Data
US 2019/0059497 A1    Feb. 28, 2019

Related U.S. Application Data

(60) Provisional application No. 62/158,189, filed on May 7, 2015.

(51) Int. Cl.
*A42B 3/06* (2006.01)
*F16F 1/18* (2006.01)
*F16F 1/368* (2006.01)

(52) U.S. Cl.
CPC .............. *A42B 3/064* (2013.01); *A42B 3/069* (2013.01); *F16F 1/185* (2013.01); *F16F 1/368* (2013.01)

(58) Field of Classification Search
CPC ......... A42B 3/064; A42B 3/069; A42B 3/125; A42B 3/062; A42B 3/04; F16F 1/185; F16F 1/368; F16F 1/3683
USPC ........................................................... 2/411
See application file for complete search history.

(56) References Cited

U.S. PATENT DOCUMENTS

| | | | |
|---|---|---|---|
| 1,199,629 A | | 9/1916 | Stocks |
| 1,203,564 A | * | 11/1916 | April ........................ A42B 3/20 2/9 |
| 1,409,326 A | | 3/1922 | Williamson |
| 1,868,926 A | * | 7/1932 | Tatore ..................... A42B 3/06 2/421 |

(Continued)

FOREIGN PATENT DOCUMENTS

| | | |
|---|---|---|
| CA | 2098923 | 12/1991 |
| CA | 2228433 A1 | 4/1999 |

(Continued)

OTHER PUBLICATIONS

International Search Report dated Sep. 21, 2016.
Patentability Search dated Jun. 8, 2016.

*Primary Examiner* — Alissa L Hoey
(74) *Attorney, Agent, or Firm* — Dickinson Wright PLLC

(57) ABSTRACT

A device for fixing to a helmet is described. The helmet includes a shell portion configured to receive a user's head, and the device includes a leaf spring for coupling to the shell portion and configured to dissipate impact forces. A helmet including such device is further described.

23 Claims, 9 Drawing Sheets

(56) References Cited

U.S. PATENT DOCUMENTS

| | | | |
|---|---|---|---|
| 3,041,623 A | 7/1962 | Glahe | |
| 3,237,201 A * | 3/1966 | Morgan | A42B 3/14 2/414 |
| 3,596,289 A * | 8/1971 | Adickes | A42B 3/04 2/422 |
| 3,795,919 A * | 3/1974 | Aho | A42B 3/166 2/423 |
| 3,797,040 A | 3/1974 | Caldwell | |
| 3,872,511 A * | 3/1975 | Nichols | A42B 3/121 2/413 |
| 3,889,296 A | 6/1975 | Martin | |
| 4,032,127 A * | 6/1977 | Lipfert | A43B 7/00 267/151 |
| 4,040,123 A | 8/1977 | Williams | |
| 4,100,619 A | 7/1978 | Piëch et al. | |
| 4,136,403 A | 1/1979 | Walther et al. | |
| 4,223,409 A | 9/1980 | Lee | |
| 4,363,140 A | 12/1982 | Correale | |
| 4,627,114 A | 12/1986 | Mitchell | |
| D289,569 S | 4/1987 | Nimmons | |
| 4,768,500 A | 9/1988 | Mason et al. | |
| 4,996,724 A | 3/1991 | Dextrase | |
| 5,091,997 A | 3/1992 | Foehl | |
| 5,333,329 A | 8/1994 | Hong | |
| 5,438,494 A | 8/1995 | Harlan | |
| 5,517,699 A | 5/1996 | Abraham, II | |
| 5,812,101 A | 9/1998 | Monarchie et al. | |
| 6,081,931 A | 7/2000 | Burns et al. | |
| 6,166,216 A | 12/2000 | Panetta et al. | |
| 6,378,140 B1 | 4/2002 | Abraham et al. | |
| 6,401,260 B1 | 6/2002 | Porth | |
| 6,579,871 B2 | 6/2003 | Panetta et al. | |
| 6,601,836 B1 | 8/2003 | Dankow et al. | |
| 6,961,963 B2 * | 11/2005 | Rosie | A42B 3/28 128/200.28 |
| 7,156,536 B1 | 1/2007 | McCorkle | |
| D584,456 S | 1/2009 | Ferrara | |
| 7,603,725 B2 * | 10/2009 | Harris | A42B 3/121 2/410 |
| 8,225,419 B2 | 7/2012 | Hersick et al. | |
| 8,499,366 B2 | 8/2013 | Nimmons et al. | |
| 8,544,118 B2 | 10/2013 | Brine, III et al. | |
| 8,683,612 B2 | 4/2014 | Siegler et al. | |
| 8,707,470 B1 | 4/2014 | Novicky et al. | |
| 8,720,923 B2 | 5/2014 | Ryshavy et al. | |
| 8,725,176 B2 | 5/2014 | Werner et al. | |
| 8,733,989 B1 | 5/2014 | Lo et al. | |
| 9,095,182 B1 | 8/2015 | Rochholz | |
| 9,131,742 B2 | 9/2015 | Gowen | |
| 9,205,320 B2 | 12/2015 | Mason | |
| 9,232,827 B1 | 1/2016 | Penn | |
| D750,847 S | 3/2016 | Noordzij et al. | |
| 9,545,125 B2 * | 1/2017 | Yoon | A41D 13/015 |
| 9,737,106 B1 * | 8/2017 | Cannon, Jr. | A42B 3/069 |
| 9,750,297 B1 * | 9/2017 | Mini Townson | A42B 3/14 |
| 9,763,487 B1 * | 9/2017 | Brown, Jr. | A42B 3/122 |
| 10,244,809 B2 * | 4/2019 | Linares | A42B 3/12 |
| 10,306,944 B1 * | 6/2019 | Ratliff | A42B 3/326 |
| 10,342,280 B2 * | 7/2019 | Valentino, Sr. | A42B 3/064 |
| 10,426,212 B1 * | 10/2019 | Ratliff | A42B 3/065 |
| 2001/0011388 A1 | 8/2001 | Nelson et al. | |
| 2002/0013407 A1 | 1/2002 | Pearce | |
| 2003/0075223 A1 | 4/2003 | Breed et al. | |
| 2004/0003452 A1 | 1/2004 | Schiebl | |
| 2004/0073987 A1 | 4/2004 | Jansen | |
| 2004/0163161 A1 | 8/2004 | Morrow et al. | |
| 2005/0058689 A1 | 3/2005 | McDaniel | |
| 2005/0099032 A1 | 5/2005 | Dehart | |
| 2005/0262619 A1 | 12/2005 | Musal et al. | |
| 2006/0035734 A1 | 2/2006 | Borunda | |
| 2006/0059605 A1 | 3/2006 | Ferrara | |
| 2006/0162036 A1 * | 7/2006 | McCalla | A42B 3/04 2/6.2 |
| 2006/0174401 A1 | 8/2006 | Prendergast | |
| 2006/0179545 A1 | 8/2006 | Arensdorf et al. | |
| 2007/0016254 A1 | 1/2007 | Grenon et al. | |
| 2007/0234600 A1 | 10/2007 | Grilliot et al. | |
| 2007/0271688 A1 | 11/2007 | Ando | |
| 2008/0141429 A1 | 6/2008 | Scharpenack et al. | |
| 2008/0163410 A1 | 7/2008 | Udelhofen | |
| 2009/0178184 A1 | 7/2009 | Brine, III et al. | |
| 2010/0286791 A1 | 11/2010 | Goldsmith | |
| 2011/0072548 A1 | 3/2011 | Hersick et al. | |
| 2011/0113519 A1 | 5/2011 | Gendron et al. | |
| 2012/0151664 A1 | 6/2012 | Kirshon | |
| 2012/0216338 A1 | 8/2012 | Arrouart | |
| 2012/0297525 A1 | 11/2012 | Bain | |
| 2012/0297526 A1 | 11/2012 | Leon | |
| 2013/0167289 A1 | 7/2013 | Rensink et al. | |
| 2013/0219598 A1 | 8/2013 | Pfanner et al. | |
| 2013/0232668 A1 | 9/2013 | Suddaby | |
| 2014/0020161 A1 | 1/2014 | Mason | |
| 2014/0059746 A1 | 3/2014 | Olivares Velasco | |
| 2014/0157498 A1 * | 6/2014 | Bird | A42B 3/0473 2/459 |
| 2014/0173810 A1 | 6/2014 | Suddaby | |
| 2014/0173812 A1 | 6/2014 | Krueger | |
| 2014/0208486 A1 | 7/2014 | Krueger | |
| 2014/0215693 A1 | 8/2014 | O'Gara | |
| 2015/0040297 A1 * | 2/2015 | Vermillion | A42B 3/04 2/422 |
| 2015/0047109 A1 | 2/2015 | Grant et al. | |
| 2015/0167768 A1 * | 6/2015 | Zhao | F16F 1/368 267/164 |
| 2015/0181338 A1 | 6/2015 | Hosoi et al. | |
| 2015/0245682 A1 | 9/2015 | McGinn et al. | |
| 2015/0250246 A1 * | 9/2015 | Phipps | A42B 3/12 2/411 |
| 2016/0037851 A1 | 2/2016 | Gupta et al. | |
| 2016/0058093 A1 | 3/2016 | Kennard et al. | |
| 2016/0073723 A1 | 3/2016 | Halldin et al. | |
| 2016/0128414 A1 * | 5/2016 | Gotti | A42B 3/085 2/421 |
| 2017/0049179 A1 * | 2/2017 | Nordin | A42B 3/166 |
| 2017/0105470 A1 * | 4/2017 | Eaton | A42B 3/064 |
| 2018/0000186 A1 * | 1/2018 | Brown | A42B 3/124 |
| 2019/0029353 A1 * | 1/2019 | Ogata | A42B 3/062 |

FOREIGN PATENT DOCUMENTS

| | | |
|---|---|---|
| CA | 2260549 | 8/2000 |
| CA | 2299593 A1 | 8/2000 |
| CA | 2563835 A1 | 11/2005 |
| CA | 2659638 | 3/2009 |
| CA | 2914144 A1 | 12/2014 |
| CN | 101516221 A | 8/2009 |
| CN | 201430985 Y | 3/2010 |
| CN | 102458839 A | 5/2012 |
| CN | 103037725 A | 4/2013 |
| CN | 204426836 U | 7/2015 |
| CN | 105357999 A | 2/2016 |
| DE | 1128156 A | 4/1962 |
| DE | 8800172 | 3/1988 |
| DE | 202011002353 | 5/2011 |
| EP | 2223619 | 9/2010 |
| GB | 472897 | 9/1937 |
| GB | 536533 | 5/1941 |
| GB | 735887 | 8/1955 |
| SU | 1454364 | 1/1989 |
| WO | WO 1995028100 | 10/1995 |
| WO | WO 2014/203180 A2 | 12/2014 |
| WO | WO 2015/089646 A1 | 6/2015 |
| WO | WO 2015/175541 A1 | 11/2015 |

* cited by examiner

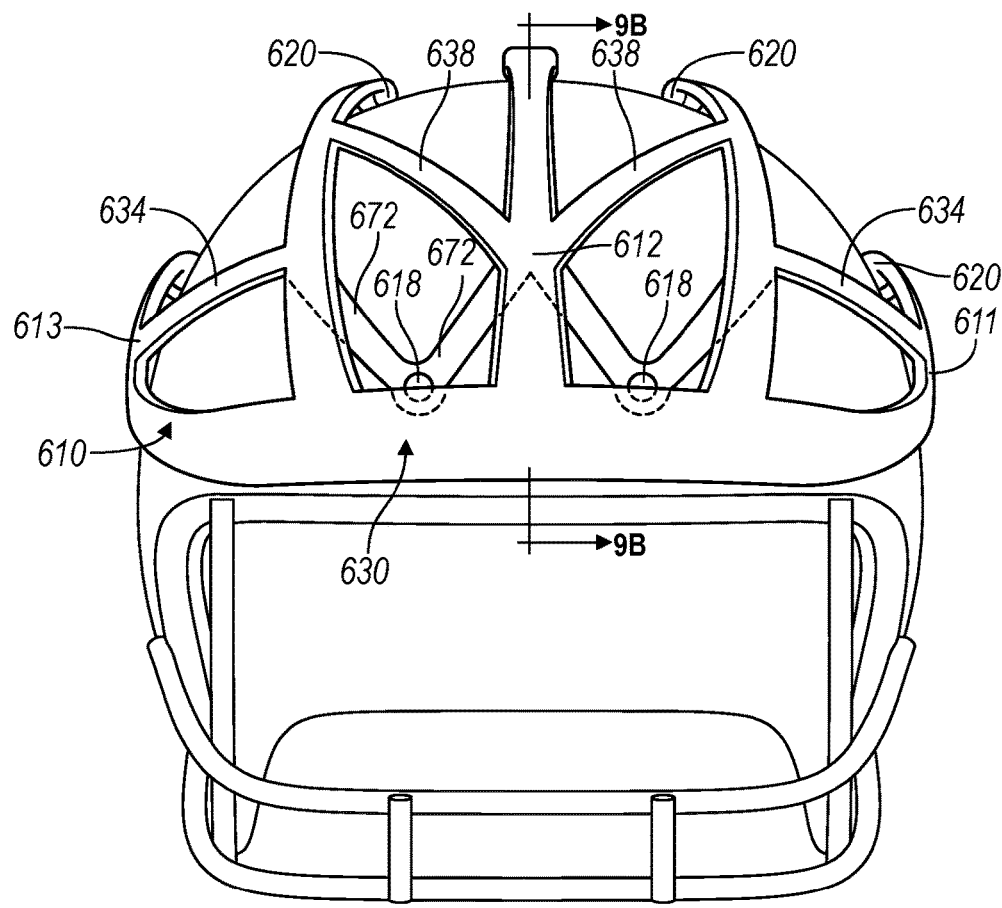
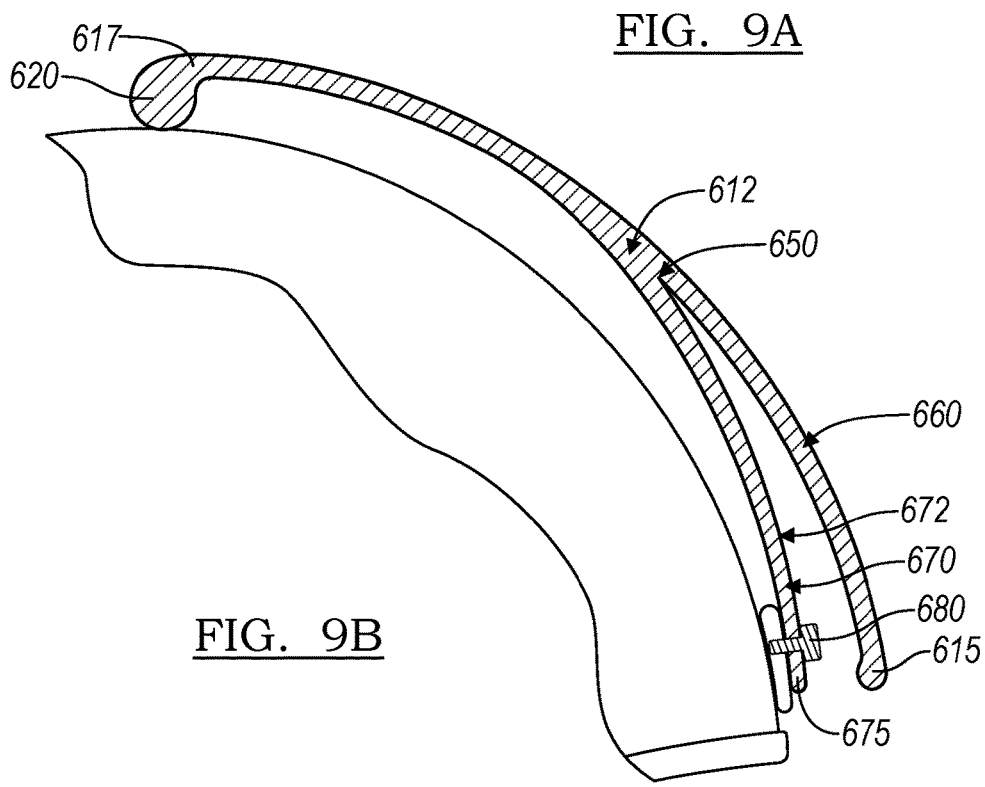
FIG. 9A
FIG. 9B

DEVICE FOR MINIMIZING IMPACT OF COLLISIONS FOR A HELMET

RELATED APPLICATIONS

The present patent document claims the benefit of the filing under 35 U.S.C. § 119(e) of Provisional U.S. Patent Application Ser. No. 62/158,189, filed May 7, 2015, and the filing of PCT/US2016/030943, filed May 5, 2016 both of which are hereby incorporated by reference.

BACKGROUND

The present disclosure relates to head protection equipment for minimizing impact of collisions.

Contact sports are facing increasing scrutiny as more is learned about concussion and subconcussive head blows. As nutritional and exercise sciences combine to produce larger, faster, stronger athletes who are capable of hitting with greater force, and sports like football increase in popularity and participation, medical experts are noting risks of potential injuries, particularly head injuries, high-impact sports.

While dramatic hits which cause individuals to lose consciousness and cause a stoppage of play or work represent much of what the public regards as the largest safety issues among football players and laborers respectively, it is becoming evident that the routine hits sustained on every play, particularly those on the offensive and defensive lines in football, may also have an additive and deleterious effect on the health of the brain. Such impacts are not merely restricted to games, but may be sustained in practice or training sessions with teammates. The effect of hundreds of impacts per season, multiplied across numerous years, may be linked to such conditions as chronic traumatic encephalopathy (CTE), which can only be affirmatively diagnosed post mortem but can manifest itself in the form of depression, confusion, aggression, memory loss, dementia, or any combination of the preceding. In certain individuals these symptoms arise immediately; in others, it may take years before they emerge. In any case, when evidence of CTE manifests, the effects appear to be generally irreversible and there is no known cure for CTE.

Football helmets were originally designed to prevent skull fractures, and have served this purpose very well. However, when plastic helmets were introduced after an era of leather helmets, many players gained confidence in the protection they afforded and started using their helmets to launch forward to make a tackle or a successful block. Furthermore, offensive and defensive linemen come into frequent helmet-to-helmet contact with each other. When the plastic helmet was introduced, skull fractures decreased, but more difficult to detect consequences of impact such as concussions appear to have increased, possibly because of the new techniques players employed in using the helmet.

One attempted solution is a soft-shell covers to cushion the head from a blow. However, while the shells may reduce the overall amount of force of a hit, they may actually increase axial loading forces. When two hard-shell helmets impact one another, the two helmets have the ability to glance off one another, minimizing the chance for axial loading to occur. However, when a soft-shell helmet gets hit by a hard-shell helmet (or by another soft-shell helmet), the soft shell gives in on impact and the helmet may more easily transfer momentum onto the spinal cord.

Another attempted solution has been the use of shock strips, which act as cushions to impacts to the helmet, but this device relies on the end user to affix them properly to the surface of the helmet. Shock strips may also reduce the glancing effect of helmets, as described above.

It is desirable to minimize the amount of force absorbed by the head of a participant in a contact sport using a resilient material.

SUMMARY

According to one aspect of the present disclosure, a helmet is provided, the helmet comprising a shell portion configured to receive a user's head, and a leaf spring coupled with the shell portion and configured to dissipate forces on the shell portion.

In another aspect of the present disclosure, a device for dissipating forces on a helmet is provided. The device comprises a base extending from a left end to a right end, and a first leaf spring. The first leaf spring comprises a first end, the first end being attached to the base; a second end, the second end comprising a free end positioned away from the base; and a first leaf spring body extending from the first end to the second end. This aspect of the present disclosure may also include a second leaf spring having a third end (or anchored end) attached to the base and a fourth end (or free end) positioned away from the base.

According to another aspect of the present embodiments, there is provided a device for dissipating forces on a helmet. The device comprises a connecting portion extending circumferentially from a left end to a right end around the front portion of a helmet; a central leaf spring having a first end attached to the connecting portion substantially midway between the left end and the right end of the connecting portion and extending to a second end, the second end comprising a foot portion configured to slide along an outer surface of the helmet; and a plurality of side leaf springs, each side leaf spring having a third end attached to the connecting portion and extending to a fourth end, the fourth end comprising a foot portion configured to slide along a surface of the helmet, the plurality of side leaf springs positioned to the sides of the central leaf spring; a plurality of secondary connecting members extending between two side leaf springs; a plurality of tertiary connecting members extending from the central leaf spring to a side leaf spring, and; an attachment portion for attaching the device to a helmet Further aspects, features, and advantages of the disclosed embodiments will become apparent from consideration of the following description and the appended claims when taken in connection with the accompanying drawings.

BRIEF DESCRIPTION OF THE DRAWINGS

Preferred embodiments are described below, by way of example only with reference to the accompanying drawings in which:

FIGS. 9A-9B are views of an impact mitigation device with a dual-layer configuration in accordance with another embodiment of the present disclosure.

DETAILED DESCRIPTION

It is to be understood that the figures are schematic and do not show the various components to their actual scale. In many instances, the figures show scaled up components to assist the reader.

"Substantially" or derivatives thereof as used herein will be understood to mean significantly or in large part. The terms "substantially" or "about" used herein with reference to a quantity includes variations in the recited quantity that are equivalent to the quantity recited, such as an amount that is equivalent to the quantity recited for an intended purpose or function.

Figure 1A:
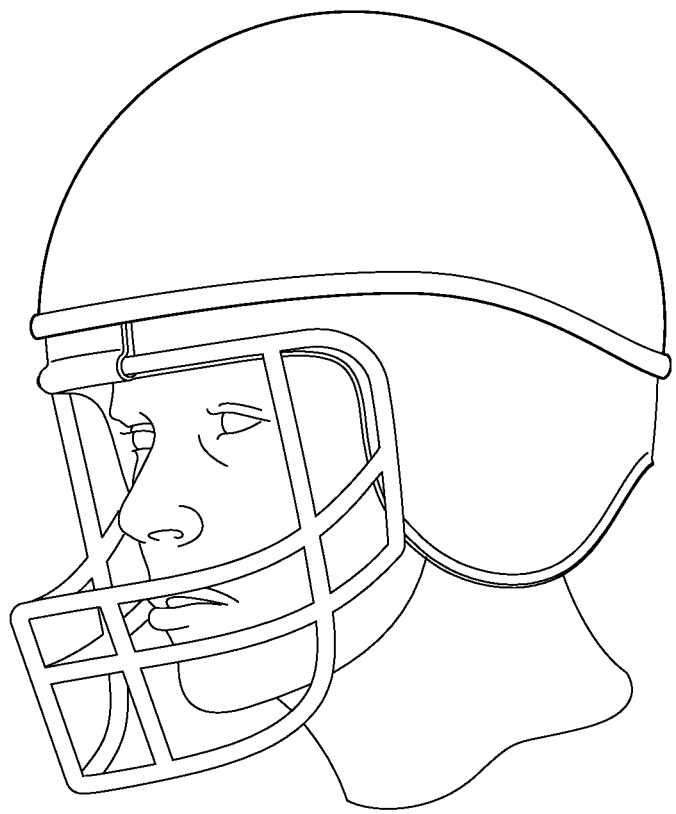
FIG. 1A is a view of a prior art design, namely the ProCap product.
Figure 1B:
FIG. 1B is a view of another prior art design, namely the Guardian Cap product.

It is an object of the present disclosure to describe a device which may effectively reduce the impact of hits to the helmet of an individual while remaining aesthetically pleasing and requiring minimal adjustment to existing helmet design. Prior attempts at modifying helmets, such as the ProCap (FIG. 1A) and the Guardian Cap (FIG. 1B), have been somewhat effective in reducing some of the impact of hits to the helmet, but have suffered from increasing the dimensions and the bulk of the helmet, which makes them unwieldy. Additionally, these prior attempts may also reduce the glancing effect of helmets. Football players, other athletes, manual laborers, and military personnel need to be able to run and to turn their heads during work and play, and excess weight or helmets that are skewed too greatly in one dimension make athletic activity awkward. A lightweight solution which does not interfere or minimally interferes with field of vision would represent a better solution.

One way to potentially reduce the impact force of a hit is to increase the distance between the impact point and the region to be protected: the skull and the brain. Modifications to the interior of a helmet are of lesser importance compared to the exterior because there is not enough space to slow a violent impact due to the tight fit of the helmet on the head. Giving the force applied more time (by increasing distance) to decelerate or to be absorbed improves the potential to decrease the magnitude of the force.

The embodiments of the present disclosure provide an increased space for slowing and reduction of force by employing at least one leaf spring in their construction. A leaf spring is an arc-shaped, resilient spring which serves to dampen impacts. The leaf springs of the disclosed device may be mono-leaf springs in that they may comprise a single arc and may not have a secondary structure with which they cooperate for purposes of their spring action. Even when multiple leaf springs are present, each leaf spring may be an independent mono-leaf.

The leaf springs of the present embodiments have an intrinsic hardness but are also resilient in such a way that allows an impact to be absorbed while ensuring the leaf spring returns to its original shape. The leaf spring is held a distance away from the surface of the helmet, and upon impact flattens, in some cases flattening to the point of contacting the helmet. The leaf springs of the present disclosure can be made in different materials (steel, titanium, polymer, plastic, carbon fiber, nylon, polycarbonate, composites, thermoplastic materials, natural and synthetic rubbers, and so forth.) The material used to make the leaf springs, or the entire device, will be selected to fit the impact force anticipated at the level of football or other activity for which the helmet is intended; for example a grade school player's helmet will have a device of lighter construction than that intended for a collegiate or professional player.

Another material from which the device may be constructed may be a thermoplastic composite which incorporates a fiberglass resin. Materials of this type are lightweight but strong. In some cases, the individual fibers of the fiberglass may be woven and combined with the thermoplastic resin in such a way as to maximize structural integrity. The device may also be constructed of multiple materials to provide a combination of impact reduction, durability, and ease of manufacturing.

Figure 2:
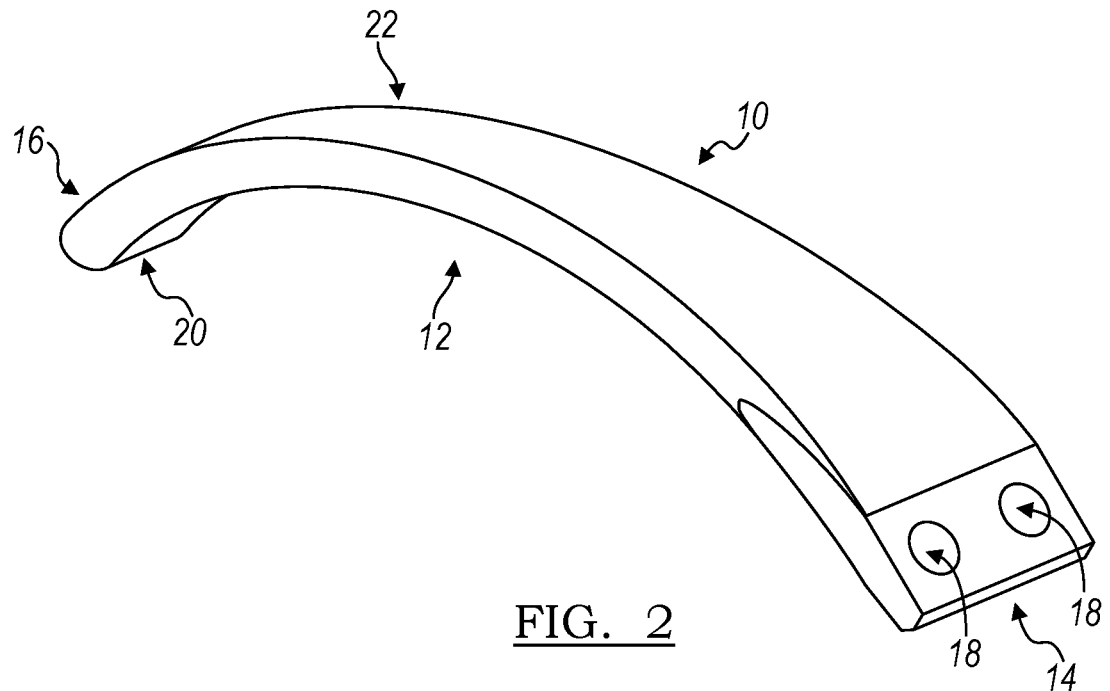
FIGS. 2-3 are views of an impact mitigation device comprising a single leaf spring in accordance with one embodiment of the present disclosure.
Figure 3:
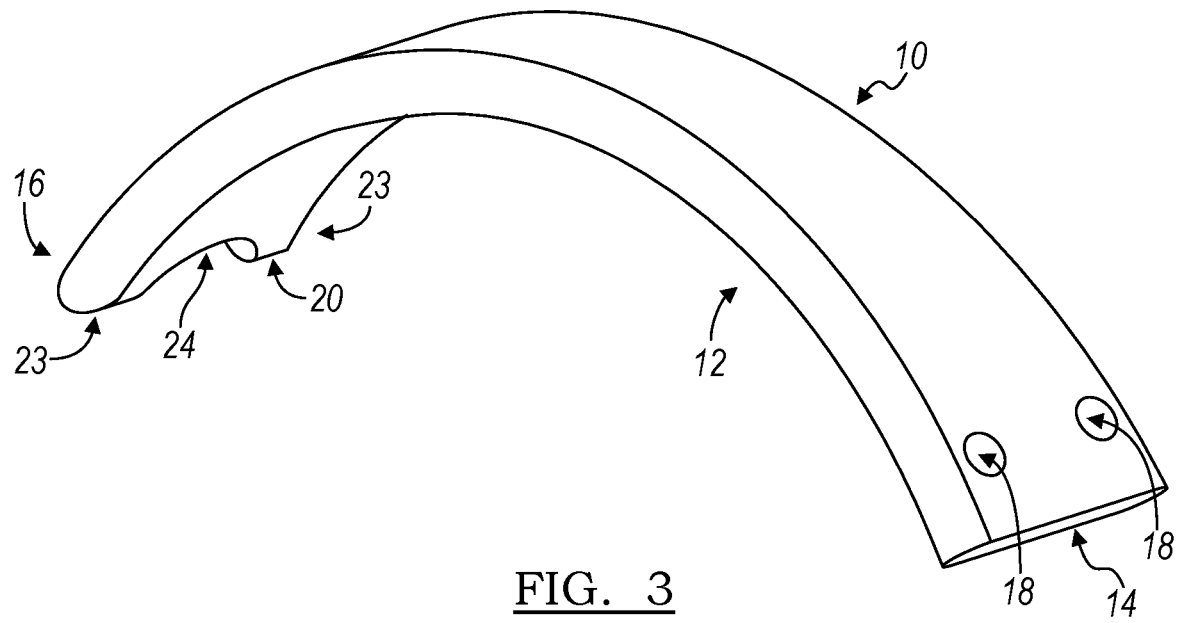

In the first embodiment as depicted in FIGS. 2-3, the device 10 may comprise a single leaf spring 12. Such a device has a first end 14 and a second end 16, with the leaf spring 12 extending from said first end 14 to the second end 16. The first end 14 has two screw holes 18 formed therethrough so that the device can be easily connected to the exterior of the helmet above the central portion of the facemask, where many helmets already have a pair of screws for attaching the facemask. The device could also be made without the screw holes and instead be attached to the helmet via at least one clip, at least one snap, at least one buckle, adhesive, Velcro, or other permanent or temporary mechanism. Alternatively, the device 10 and the helmet may be one unitary component, in that the device 10 is molded as an integral part of the helmet. Such modes of attachment are merely exemplary and should not be taken to be limiting, and apply to all embodiments of devices described herein.

In the device of FIGS. 2-3, the leaf spring 12 then extends back and up the center of the helmet to the crown of the helmet, or just past the crown, where the second end 16 is positioned away from the base and rests upon or is slightly spaced apart from the exterior of the helmet. In one embodiment, the device has at its second end a foot 20, which can be a disc-like or cylinder-shaped protrusion which sits on the exterior of the helmet in its pre-impact configuration and which facilitates sliding along the surface of the helmet on impact. In the embodiment illustrated in FIG. 3, the device 10 has a foot 20 which has two helmet-contacting portions 23 separated by an arc 24.

A leaf spring 12 as described herein may be of a variety of thicknesses. For instance, a plastic leaf spring may be about 2 millimeters (mm) to about 10 mm thick, or between about 4 mm and about 8 mm thick, or about 7 mm thick. In the case of a metal leaf spring, for instance one made of steel, the leaf spring 12 may be at one point about 1 mm to about 5 mm thick, or more particularly about 2 mm to about 3 mm thick.

The device 10 may comprise a leaf spring 12 having one of a variety of profiles. For instance, in the case of the embodiment of FIG. 2, the leaf spring 12 has a tapering profile, with the first end 14 being the widest part of the device 10, the device tapering through point 22 to the thinnest portion of the device at second end 16. Contrarily, the embodiment depicted in FIG. 3 has substantially the same width across its entire length.

Figure 4:
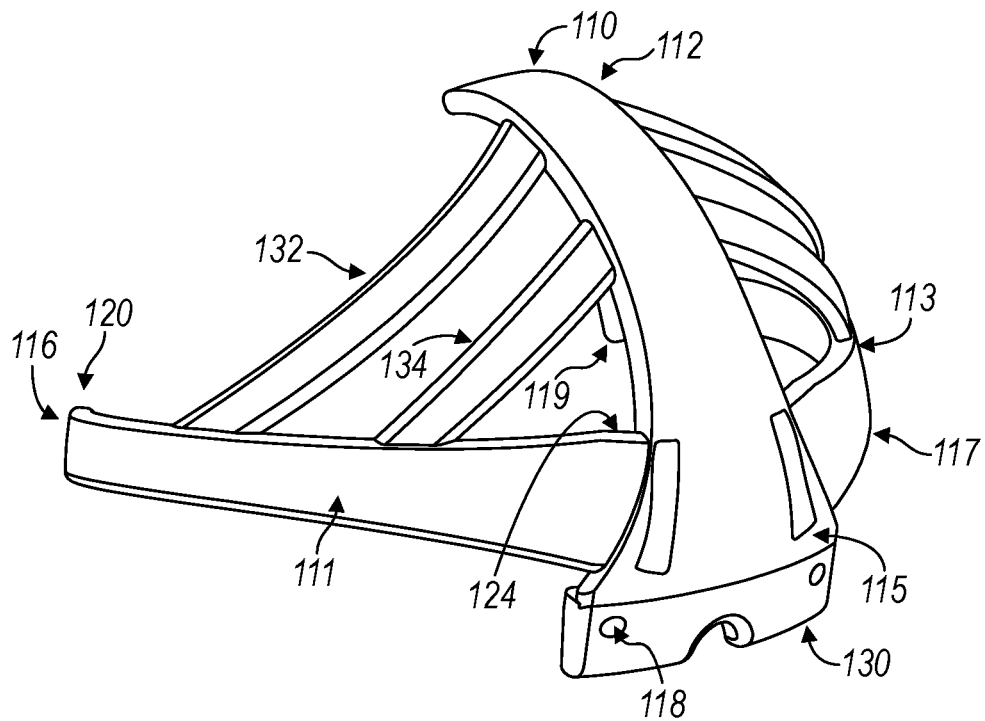
FIG. 4 is a view of an impact mitigation device comprising three leaf springs and a number of connecting members in accordance with one embodiment of the present disclosure.
Figure 5:
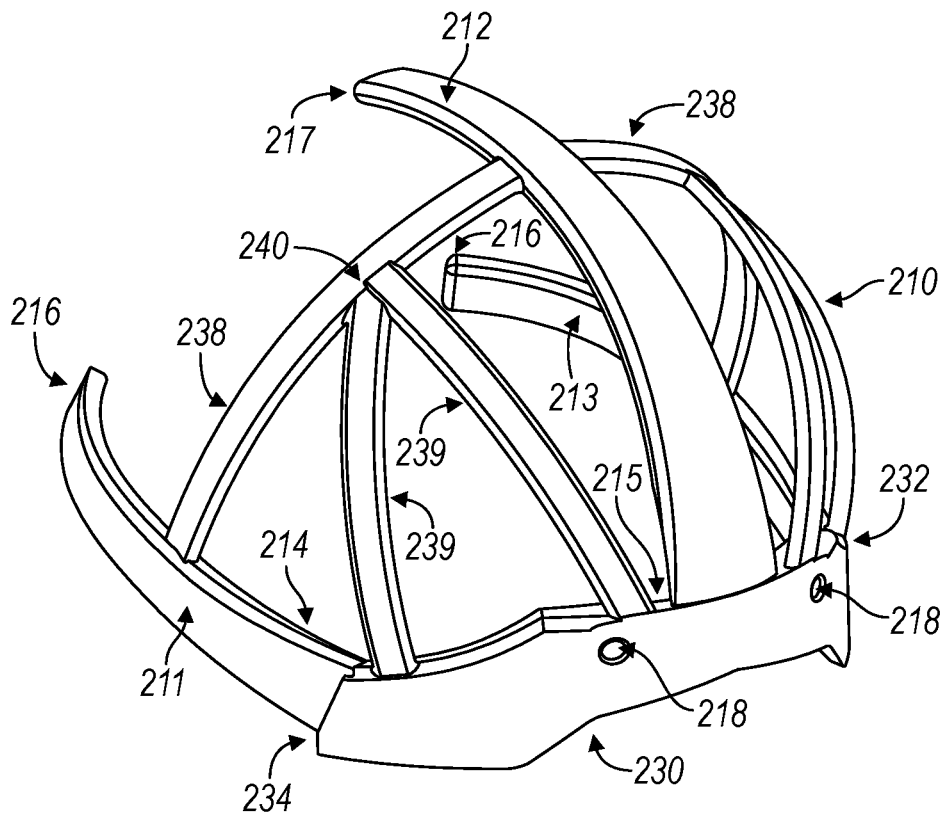
FIG. 5 is a view of an impact mitigation device comprising three leaf springs and a number of connecting members in accordance with another embodiment of the present disclosure.
Figure 6A:
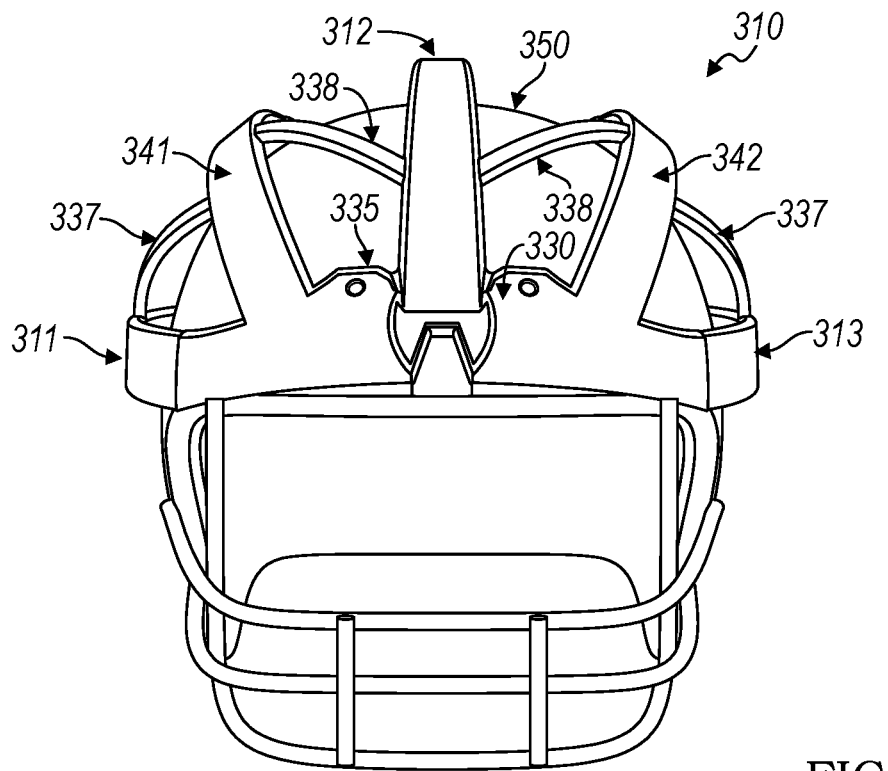
FIGS. 6A-6B are views of an impact mitigation device comprising five leaf springs and a number of connecting members in accordance with another embodiment of the present disclosure.
Figure 6B:
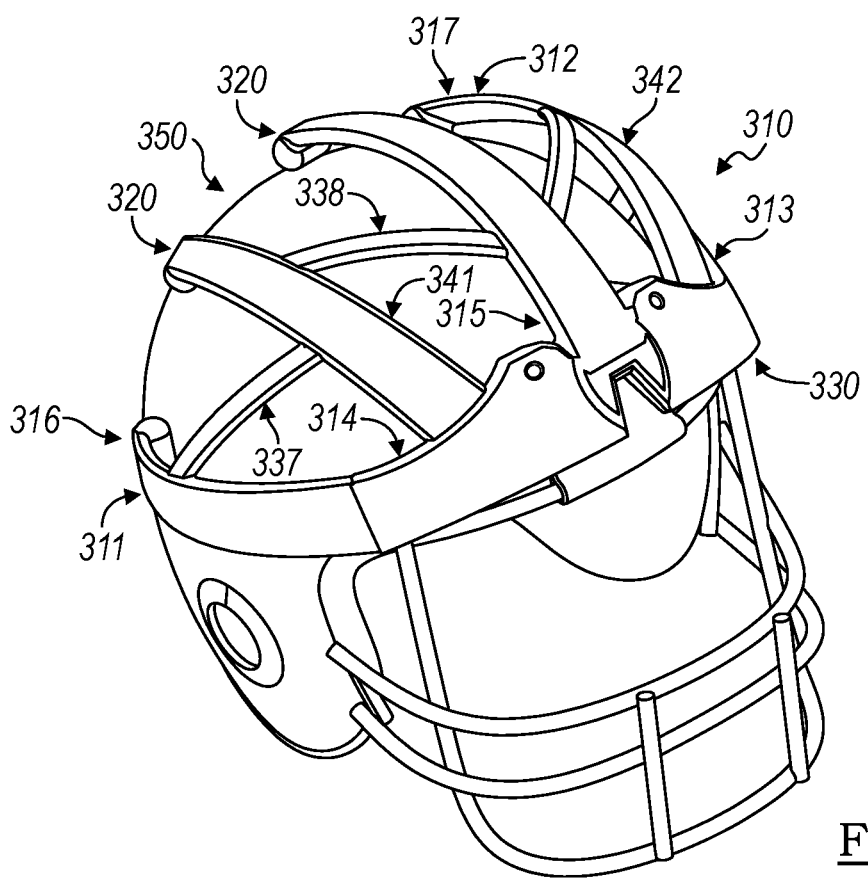
Figure 7:
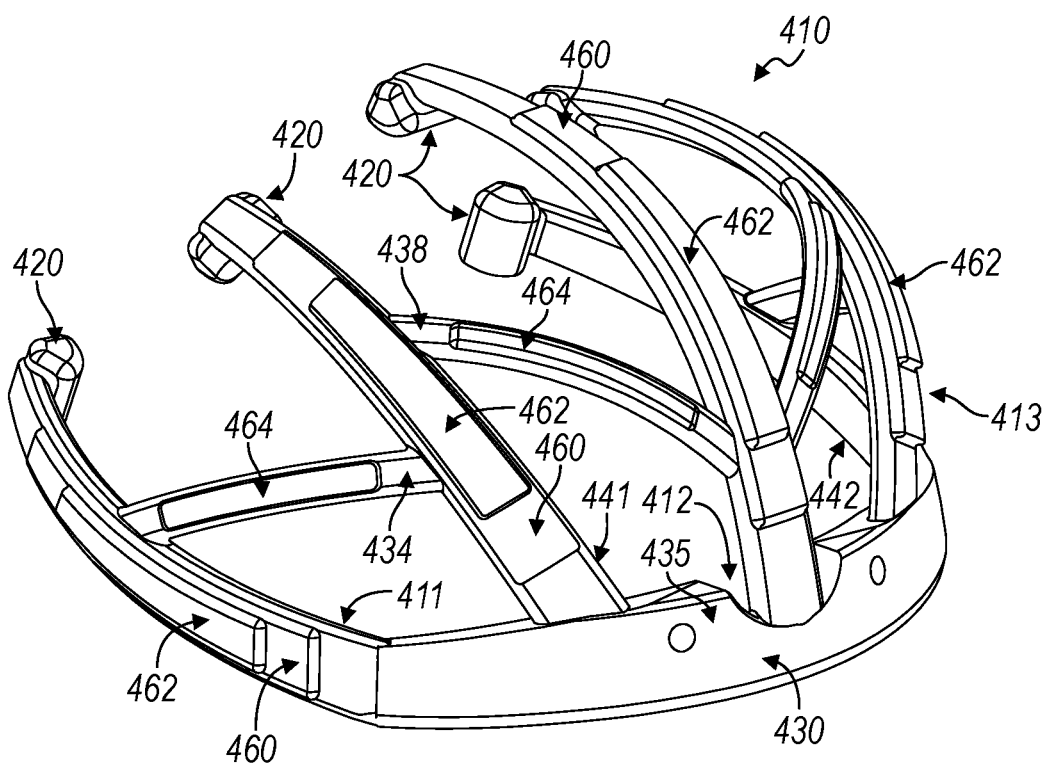
FIG. 7 is a view of an impact mitigation device comprising five leaf springs and a number of connecting members in accordance with another embodiment of the present disclosure.

In further embodiments, such as are shown in FIGS. 4 and 5, the device may comprise multiple leaf springs attached to a unitarily-formed base. The base may comprise a variety of designs. For instance, in the device 110 of FIG. 4, the base 130 is a small extension from the first end 115 of central leaf spring 112. In contrast, in the embodiment of FIG. 5, the base 230 runs circumferentially around the exterior of the helmet from left end 232 to right end 232. The base 230 would, upon attachment to a helmet, lie approximately over the forehead and extending substantially from temple to temple, the portions over the temple representing a right end and a left end of the base.

In the embodiments of FIGS. 4-5, one side leaf spring 113 is attached at its first end (or anchored end) 117 to the end of the base 130 and extends to its second end 119 just past the left ear; a second side leaf spring 111 is similarly attached over the right ear. A central leaf spring 112 runs centrally up the forehead area and past the crown, mirroring the embodiment of FIGS. 2 and 3. Such a device covers the entire frontal hemisphere of the helmet, where most concussion-causing hits occur. Additionally or alternatively, connecting members 132/134 may connect the base to a leaf spring, or the base to another connecting member, in order that maximal force be absorbed throughout the entirety of the device, or a specific target area for specific protection of the back or side of the helmet.

FIG. 5 illustrates how different connecting members may provide structure to the device 210. First connecting members 238 originate from the side leaf springs 211/213 and extend arcuately to the central leaf spring 210. Second connecting members originate from the base 230 and extend to the first connecting member 238, meeting at intersection point 240.

In the embodiments of FIGS. 4-5, each of the leaf springs 111/112/113/211/212/213 may comprise a foot at its second or free end, allowing for sliding and resilient action of the leaf spring. Connecting members which may or may not be leaf springs connect the three leaf springs together to give the device its overall structure.

The embodiments of FIGS. 6A-B, 7, and 8A-8F represent yet another device in accordance with the principles of the present disclosure. In these embodiments, the device comprises five leaf springs. Overall the structure is similar to a three-leaf spring embodiment of FIG. 5, except that a fourth leaf spring 342 is attached the base 330 and runs between the left leaf spring 313 and the central leaf spring 312, and a fifth leaf spring 341 is attached to the base 330 and runs between the right leaf spring 311 and the central leaf spring 312. Such an arrangement provides yet more assurance that an impact, such as from another helmet, will contact a leaf spring, which is better suited to react to the incoming force than unprotected portions of the helmet 350. In these embodiments, a single connecting portion 337/338 is disposed between each leaf spring at an angle to said leaf springs, providing a contact area across the entire front hemisphere of the helmet 350 while minimizing the material used and the weight added by the device. In each case there is an attachment portion 335 for screwing the device onto the helmet provided in the central portion of the base 330, and the second ends (for example second ends 316 and 317) of each leaf spring 311/341/312/342/313 are free ends which optionally comprise a foot (or free end) 320 and are free to slide across the surface of the helmet 350.

Furthermore, as is best shown in the embodiments of FIGS. 7 and 8A-F, the leaf springs are of a beveled construction. In such embodiments, beveled portions 460 of the leaf springs 411/412/413/441/442 extend outward from the surface of the helmet and effectively increase stopping distance to allow for further mitigation of collision forces. Such beveling also increases the chances that an impact will be directed to that outermost portion of the device 410 and can be designed such that the bevels 460 occur on the portion of the leaf spring which is best-positioned to absorb the force from a hit. Optionally, the device 410 has secondary bevels 462 formed on the bevels 460 to increase stopping distance yet further. Additionally, the connecting members 437/438 may also be beveled at portions 464.

Turning to FIGS. 8A-8F, several views of a device 510 in accordance with the principles of the present disclosure are provided. The design of the device 510 is similar to that of the embodiment of FIG. 7, having five leaf springs: a central leaf spring 512 having first end (or anchored end) 515 and extending to second end 517 arcuately such that it may fit over the crown of a helmet. The central leaf spring 512 may be attached to the base 530 approximately halfway between the left end of the base 530 and the right end of the base 530. Left side leaf spring 513 and right side leaf spring 511 continue are attached to the base 530 and, together with the base 530, comprise a substantially arcuate portion which extends from at or behind the left ear, across the forehead, and ends at or behind the right ear of a wearer. Fourth leaf spring 542 is positioned substantially between, in some embodiments approximately halfway between, the center leaf spring 512 and the left leaf spring 513. Fifth leaf spring 541 is constructed in a similar manner and is attached to base 530 and positioned between the central leaf spring 512 and right leaf spring 511, in some embodiments approximately halfway between the central leaf spring 512 and right lead spring 511.

In some embodiments, base 530 may itself be a leaf spring. In such an embodiment, left and right leaf springs 513 and 511 may be considered extensions of or portions of base leaf spring 530.

First connecting members 538 extend from the central leaf spring 512 and adjacent leaf springs 541/542, and second connecting members 537 extend between right leaf spring 511 and fifth leaf spring 541, as well as between left leaf spring 513 and fourth leaf spring 542. Optionally, the leaf springs have beveled portions 560 formed on their outer surfaces, and the connecting members have beveled portions 564 on formed on their outer surface. In addition, each leaf spring may terminate in a foot 520, which may be a free end, and may slide across the surface of a helmet to which the device 510 is mounted.

Figure 8A:
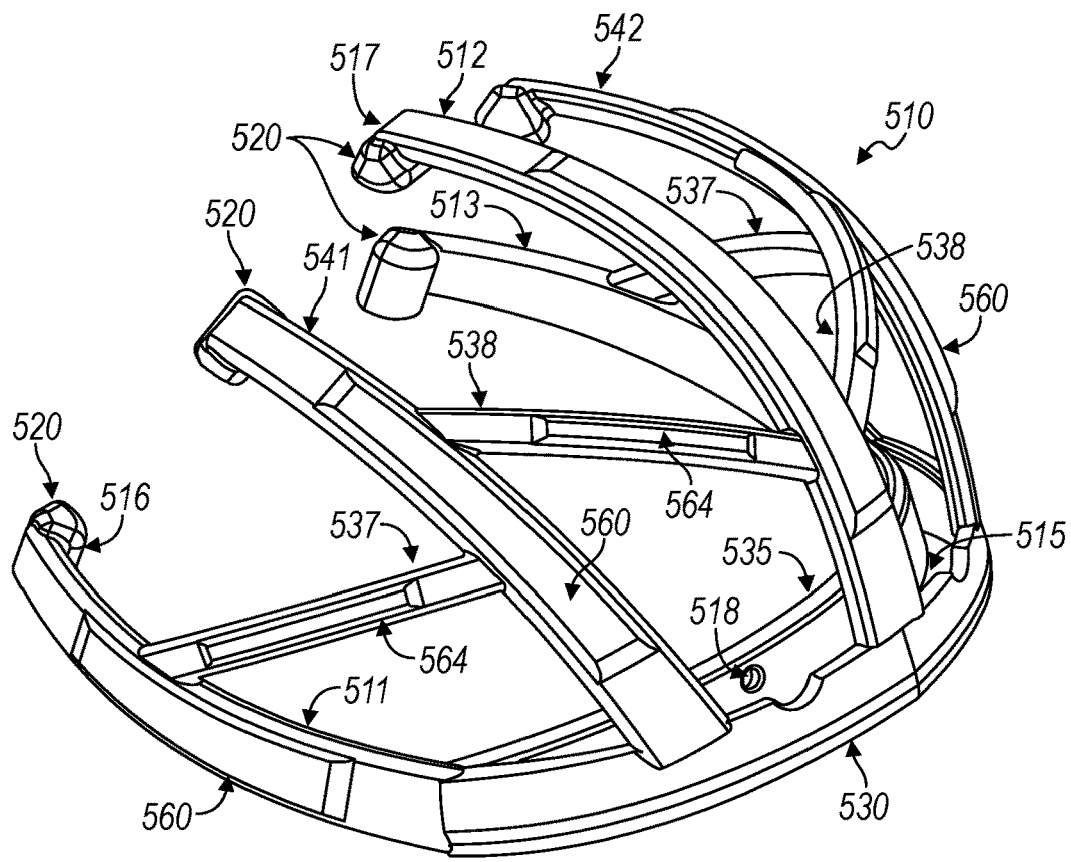
FIGS. 8A-8F are views of an impact mitigation device comprising five leaf springs and a number of connecting members in accordance with another embodiment of the present disclosure.
Figure 8B:
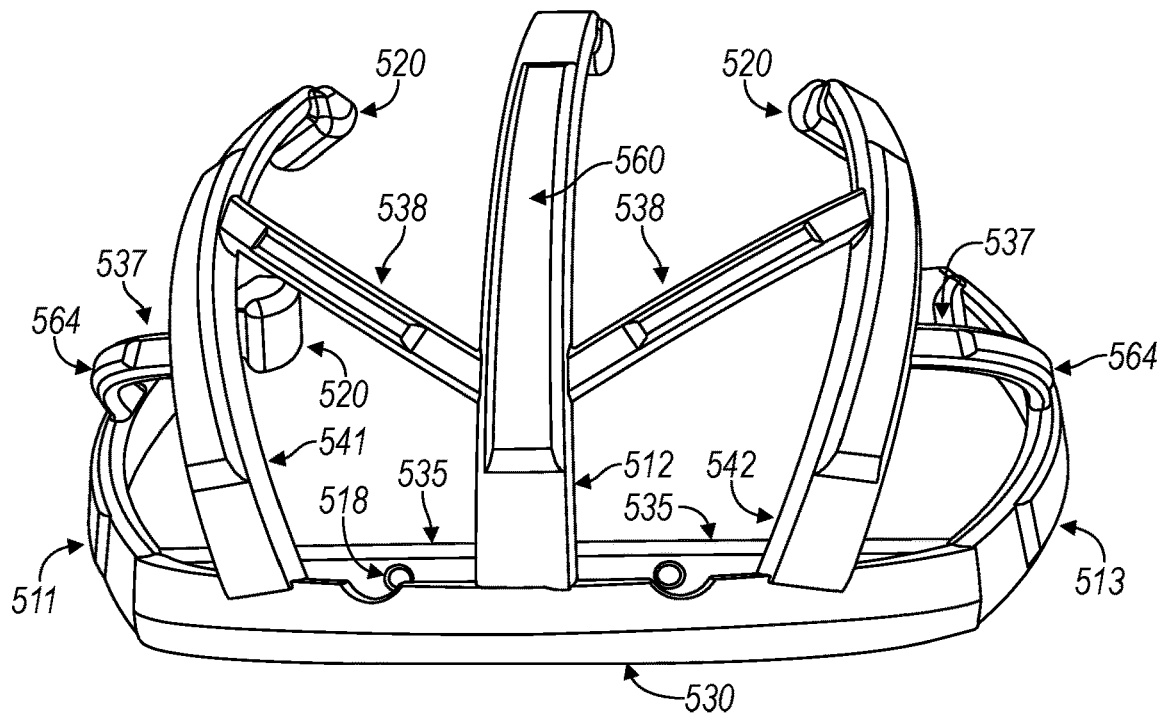
Figure 8C:
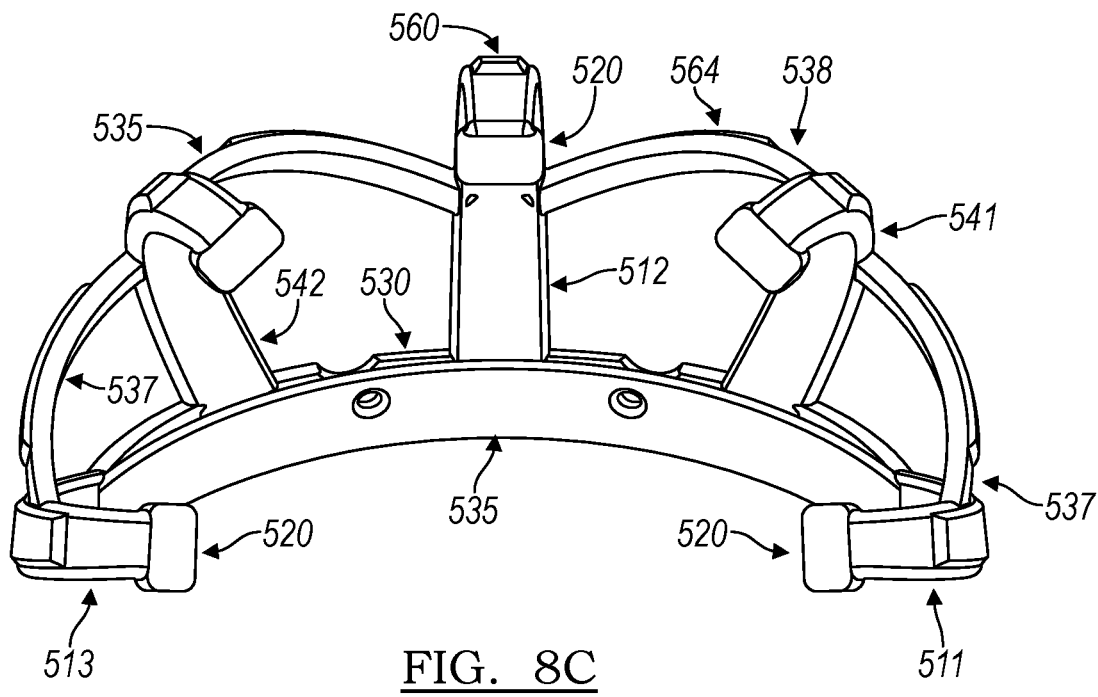
Figure 8D:
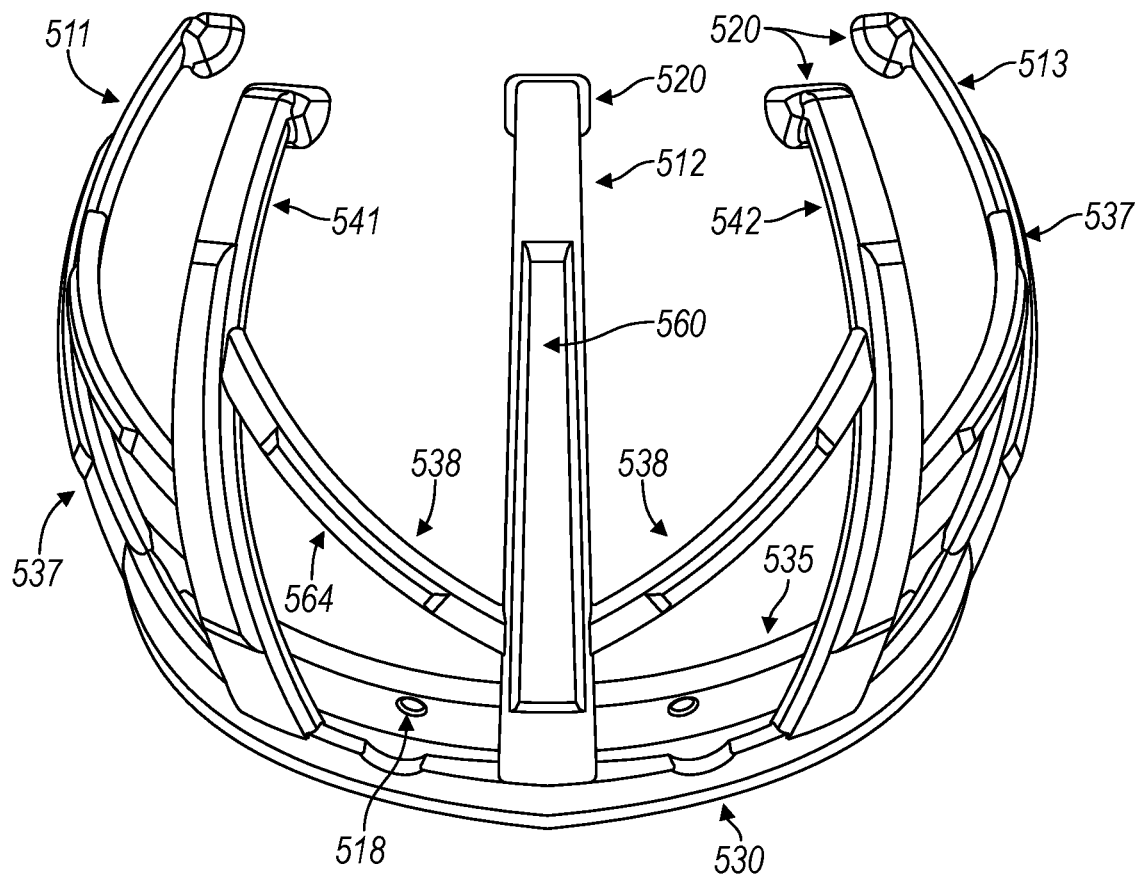
Figure 8E:
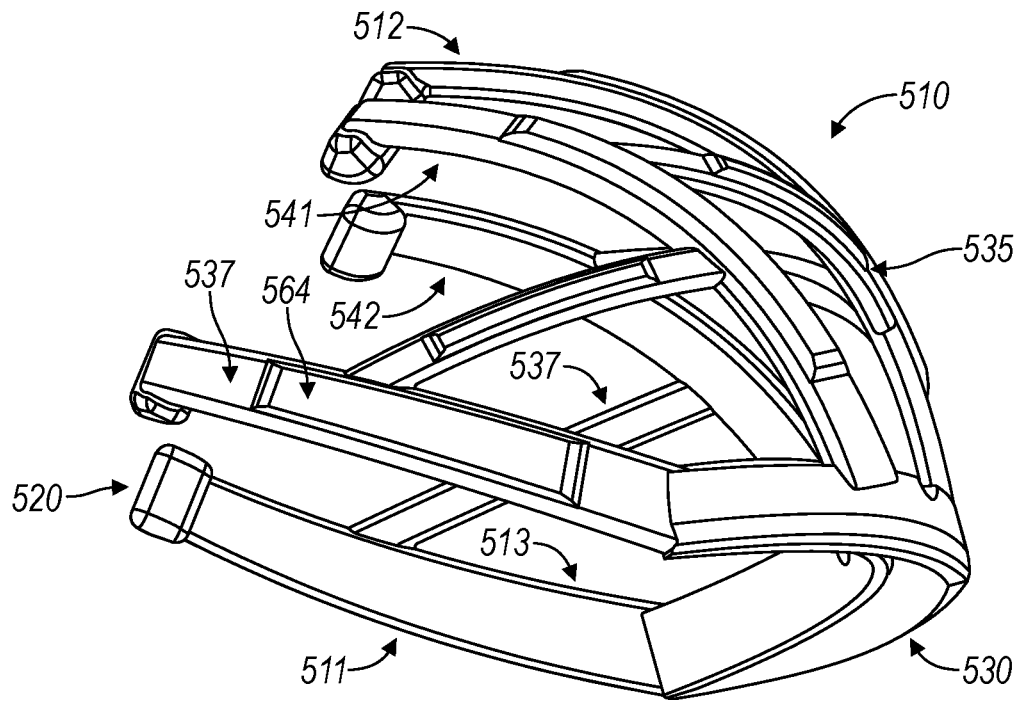
Figure 8F:
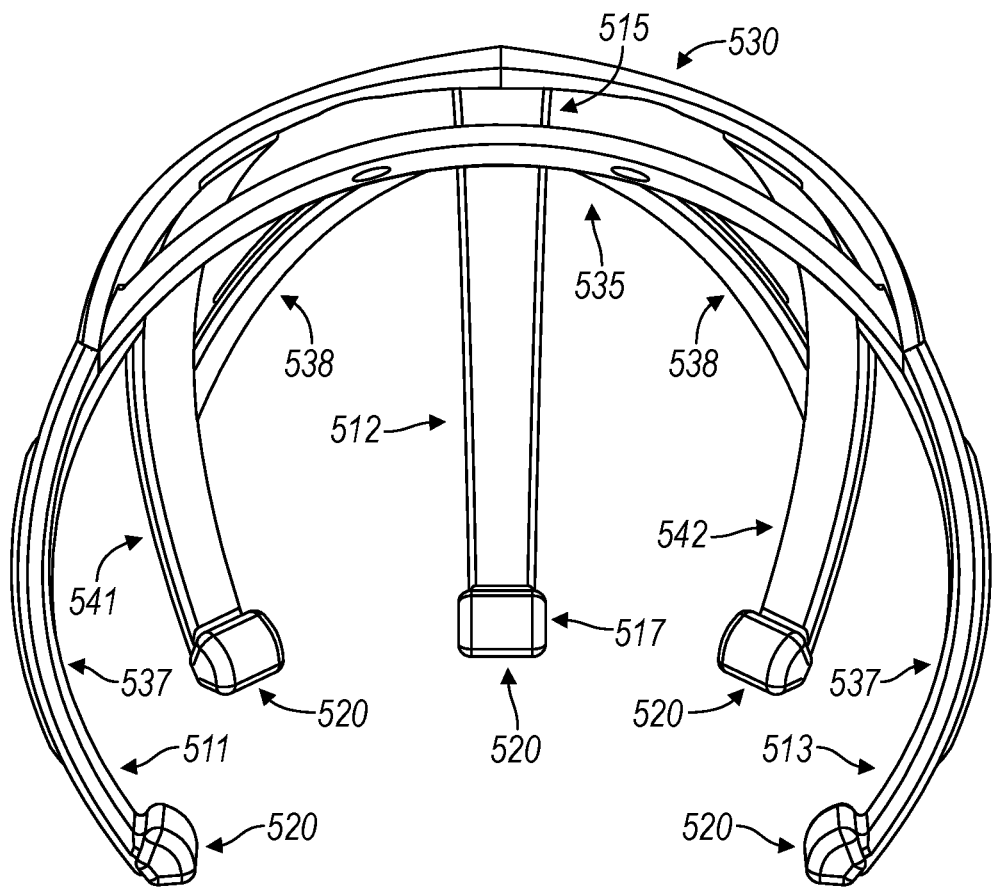

In this embodiment, and as best seen in FIG. 8D, connecting portion 535 extends as a rear portion separate from the front portion of the base 530. This provides more spacing of the base away from the surface of a helmet. Connecting portion 535 has screw holes 518 formed therethrough to provide a convenient way of attaching the device 510 to a helmet, though the device may be attached via a different mechanism.

Another embodiment of an impact-mitigating device in accordance with the principles of the present description is illustrated in FIGS. 9A-9B. In this embodiment, the device 610 includes two layers of leaf springs. In the exemplary device 610 depicted in FIG. 9A, first layer (or outer layer) 660 has a similar structure to device 510 of FIG. 8A-8F, with leaf springs 611/612/613/641/642 extending from base 630, positioned at the forehead portion over the shell of the helmet, over the crown and optionally terminating in feet 620. In some embodiments, base 630 may itself be a leaf spring. In such an embodiment, left and right leaf springs 613 and 611 may be considered extensions of or portions of base leaf spring 630. Connecting portions 634/638 may optionally connect adjacent leaf springs to one another. In addition, device 610 has a second layer 670 positioned between the first layer 660 and the shell of the helmet 680 to which it may be attached. The second layer 670 is positioned adjacent to, and inward of, the first layer 660; that is, when attached to a helmet, second layer 670 is closer to the surface of the helmet than first layer 660. The second layer 670 may be unitarily constructed with first layer 660 and may include a layer of leaf springs 672 that underlie the first layer 670. The device 610 includes four leaf springs 672 in the embodiment depicted in FIG. 9A. However, in other embodiments, a single leaf spring or any other number of leaf springs may be employed.

A cross-section of the device 610 taken along line 9B of FIG. 9A is shown in FIG. 9B. The spatial arrangement of first layer 660 and second layer 670 relative to one another can be seen in this view. The first layer 660 extends from first end 615 to convergence point 650, and the second layer 670, which includes leaf springs 672, likewise extends from second end 675 to convergence point 650, at which point the leaf spring 612 becomes a single-layer portion of the device through third end 617, which may an anchored end, and foot 620, which may be a free end. The first and second layers 660/670 may be capable of motion independent of one another, or may optionally move in concert.

The second layer 670 is affixed to the helmet 680 in this embodiment via screw 682, although other ways of attaching the device 610 to the helmet 680 as described herein may be used instead. A device of this design will assist in mitigating an impact directly to the attachment point by allowing for a change in the first point of flexion from the base 630 of the device to a point substantially at the convergence point 650. Furthermore, after the leaf spring of first layer 660 bends in response to such an impact, it will contact the leaf spring of the second layer 670, which in turn will also flex, providing further mitigation of the impact. Therefore, the layering of these leaf spring structures provides an additional dimension of flexibility to the base of the device. A multilayer device as depicted in FIGS. 9A-9B can be manufactured in a number of ways, including by injection molding.

The positioning of the impact-mitigating device can be tailored to specific applications as desired. In the case of a football helmet, which has an exterior generally made up of the protective shell portion (surrounding the cranium) and the facemask (positioned over the face), attachment to either the shell, the facemask, or both, is contemplated. Moreover, the device could be fixed at the front of the helmet, as shown in a variety of illustrations included herewith, or in the back of the helmet, or on at least one side of the helmet, or any combination thereof. The length of the leaf springs could be such that they cover a portion of or the entirety of the helmet in any dimension.

It is noted that the principles of the present disclosure will find uses beyond football, and indeed beyond sports. Other sports where head injuries have become a pressing concern include but not limited to lacrosse, ice hockey, field hockey, skiing, snowboarding, cycling, skateboarding, rollerblading, and motorsports including snowmobiling and the use of all-terrain vehicles (or four-wheeling). In all of these sports and recreational activities there is a danger of contact with other players, the environment, or equipment which could case immediate or long term head injuries. Other activities where head injuries occur such as construction worksites and military training and combat activities are also coming under more scrutiny to protect participants.

In these embodiments it may be advantageous to form the entire device unitarily by any suitable technique. In one embodiment, a plastic device or a metal device in accordance with the principles of this disclosure may be cast as in a mold. In another embodiment such a device may be created by an additive manufacturing process, such as 3D printing. These examples are not intended to be limiting.

Devices of this construction have numerous further advantages which make them both effective and suitable for use in the context of any level of football, or other head injury prone activity. For instance, if a sports league does not adopt a force mitigation device for use in official games, but a player wishes to derive the benefit of less force to the head during practices, the device can be easily removed from the helmet by removing the two screws that attach it to the helmet. Therefore the same helmet, which is adapted to fit the player securely and individually, can be used for practices and for games.

Aesthetically, the device of the present disclosure is thought to be capable of working in the context of any sports league, worksite or other time a helmet is or could be worn. To keep disruptions of design elements to a minimum, the device may be formed as part of the helmet or add on of an appropriately-colored plastic or polymer, or, if made of metal or other material, the device can be painted to fit the color scheme of the particular team which will be using it. In another embodiment, the device may be made of a transparent resilient plastic so that there is no disruption to the design of a helmet at all. In a further embodiment, to maintain the aesthetics specified by a team, a nylon or similar fabric shell may be stretched over the device to provide a uniform appearance.

While the present invention has been described in terms of preferred embodiments, it will be understood, of course, that the invention is not limited thereto since modifications may be made to those skilled in the art, particularly in light of the foregoing teachings.

What is claimed is:

1. A helmet comprising:
    a shell portion having interior surface and an exterior surface, the interior surface configured to receive a user's head;
    a first leaf spring coupled with the shell portion and disposed on the exterior of the shell configured to dissipate forces, wherein the first leaf spring has a first end connected to the shell portion and a second end being free and configured to move relative to the shell portion, the second end configured to rest against the exterior surface of the shell portion and slide along the exterior surface when the first leaf spring receives an impact; and
    a second leaf spring having a first end connected to the shell portion and a second end configured to move relative to the shell portion, the second end of the second leaf spring configured to rest against the exterior surface of the shell portion and slide along the exterior surface when the leaf spring receives an impact
    wherein the exterior surface of the shell portion and the first leaf spring and second leaf spring define the outermost surface of the helmet that is exposed to impacts.

2. The helmet according to claim 1, wherein the second end of the first leaf spring has a foot defining a curved protrusion configured to rest against the exterior surface of the shell portion and facilitate the foot sliding along the exterior surface of the shell portion when the first leaf spring receives the impact, and wherein the second end of the second leaf spring has a foot defining a curved protrusion configured to rest against the exterior surface of the shell portion and facilitate the foot sliding along the exterior surface of the shell portion when the second leaf spring receives the impact.

3. The helmet according to claim 1, wherein the first leaf spring and the second leaf spring are integrally connected with each other and unitarily formed.

4. The helmet according to claim 1, wherein the second end of the leaf spring and the second end of the second leaf spring are independently moveable relative to each other and the shell portion.

5. The helmet according to claim 1, wherein the helmet has an upper crown and a lower peripheral edge defining an opening for receiving a head of a user, and wherein the first end of the first leaf spring and the first end of the second leaf spring are attached to the helmet adjacent the lower peripheral edge such that the first leaf spring and the second leaf spring extend from the lower peripheral edge towards the upper crown of the helmet.

6. A device for dissipating forces on a helmet comprising:
a base directly affixed to the helmet via a fastener;
a first leaf spring having an anchored end attached to the base and a free end opposite the anchored end, the first leaf spring extending along an exterior surface of the helmet, the free end configured to rest against the helmet and slide along the exterior surface of the helmet in a direction of elongation of the first leaf spring when the first leaf spring receives an impact from the exterior; and
a second leaf spring having an anchored end attached to the base and a free end opposite the anchored end, the second leaf spring extending along an exterior surface of the helmet, the free end configured to rest against the helmet and slide along the exterior surface of the helmet in a direction of elongation of the second leaf spring when the second leaf spring receives an impact from the exterior;
wherein the exterior surface of the shell portion and the first and second leaf springs define the outermost surface of the helmet that is exposed to external forces.

7. The device according to claim 6, wherein the first leaf spring is attached to the base at a first point adjacent a midpoint along a length of the base.

8. The device according to claim 7, wherein the second leaf spring is attached to the base at a second point between an end of the base and the first point.

9. The device according to claim 7, further comprising a third leaf spring attached to the base at a third point spaced away from the first point and opposite the second point.

10. The device according to claim 6, wherein the base and the first, second and third leaf springs are formed as a single piece.

11. The device according to claim 6, wherein the first and second leaf springs each include a first layer comprising a first leaf spring portion and a second layer comprising a second leaf spring portion, the second layer positioned inward of the first layer relative to exterior surface of the helmet.

12. The device according to claim 6, wherein the second end of the first leaf spring has a foot defining a curved protrusion configured to rest against the exterior surface of the helmet and facilitate the foot sliding along the exterior surface when the first leaf spring receives the impact, and wherein the second end of the second leaf spring has a foot defining a curved protrusion configured to rest against the exterior surface of the helmet and facilitate the foot sliding along the exterior surface when the second leaf spring receives the impact.

13. The device according to claim 6, wherein the helmet has an upper crown and a lower peripheral edge defining an opening for receiving a head of a user, and wherein the base is fixedly attached to the helmet adjacent the lower peripheral edge such that the first leaf spring and the second leaf spring extend from the base towards the upper crown of the helmet.

14. A device for dissipating forces on a helmet having a crown and a lower peripheral edge defining an opening for receiving a head of a user, the device comprising:
a connecting portion extending circumferentially from a left end to a right end around a front portion of the helmet, the connecting portion having an attachment portion fixedly attached to the helmet adjacent the lower peripheral edge;
a central leaf spring having a first end attached to the connecting portion midway between the left end and the right end of the connecting portion and extending to a second end, the second end comprising a foot portion configured to rest against and slide along an outer surface of the helmet; and
a plurality of side leaf springs, each side leaf spring having a third end attached to the connecting portion and extending to a fourth end, the fourth end comprising a foot portion configured to rest against and slide along an outer surface of the helmet, each of the third ends of the plurality of side leaf springs being positioned between the first end of the central leaf spring and one of the left end and the right end of the connection portion;
a plurality of secondary connecting members extending directly between two of the plurality of side leaf springs, each secondary connecting member having a fifth end fixed to a first side leaf spring and a sixth end fixed to a second side leaf spring;
a plurality of tertiary connecting members extending directly from the central leaf spring to at least one of the plurality of side leaf springs, each tertiary connecting member having a seventh end fixed to the central leaf spring and an eighth end fixed to the at least one of the plurality of side leaf springs.

15. The device according to claim 14, wherein the attachment portion is configured to be attached to the helmet via at least one of: screws, a buckle, snaps, and molding.

16. The device according to claim 14, wherein the attachment portion is configured to be attached to a shell of the helmet.

17. The device according to claim 14, wherein the attachment portion is configured to be attached to a facemask of the helmet.

18. The device according to claim 14, wherein the device is made of hard plastic.

19. The device according to claim 18, wherein the hard plastic is a clear plastic.

20. The device according to claim 14, wherein the device comprises at least one of a nylon, a polycarbonate, a rubber, a thermoplastic material, and a plastic composite.

21. The device according to claim 14, wherein at least one leaf spring among the central and plurality of side leaf springs comprises a first layer and a second layer inward of the first layer and spaced apart therefrom, the first and second layers each having a curved shape so as to function as a leaf spring.

22. The helmet according to claim 14, wherein the second and fourth ends are independently moveable relative to each other and the helmet.

23. The helmet according to claim 14, wherein the attachment portion is held immediately adjacent the outer surface of the helmet by a fastener.

* * * * *